(Q-R)

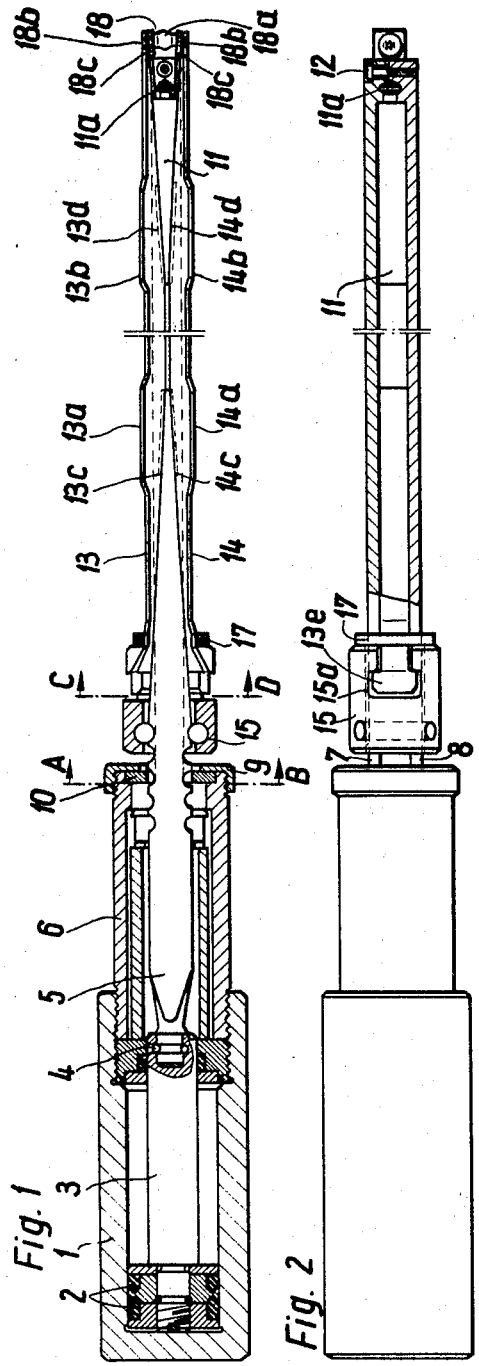

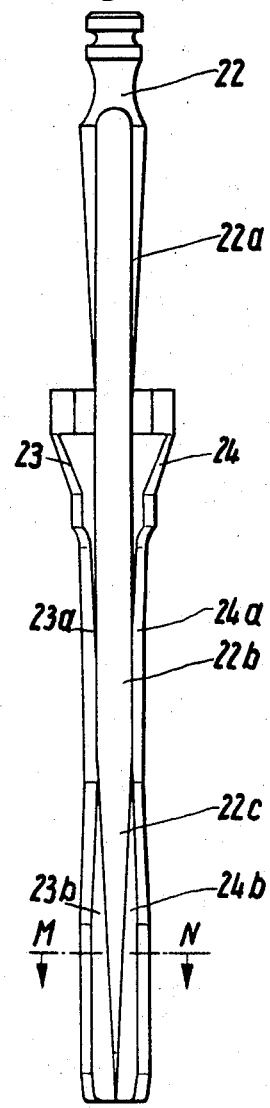
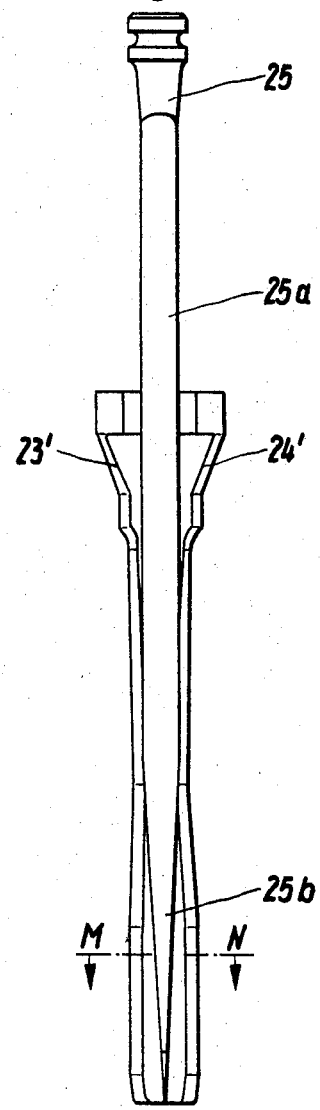
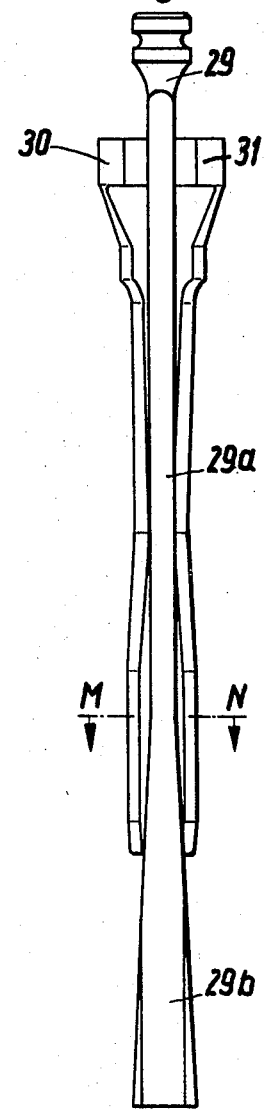

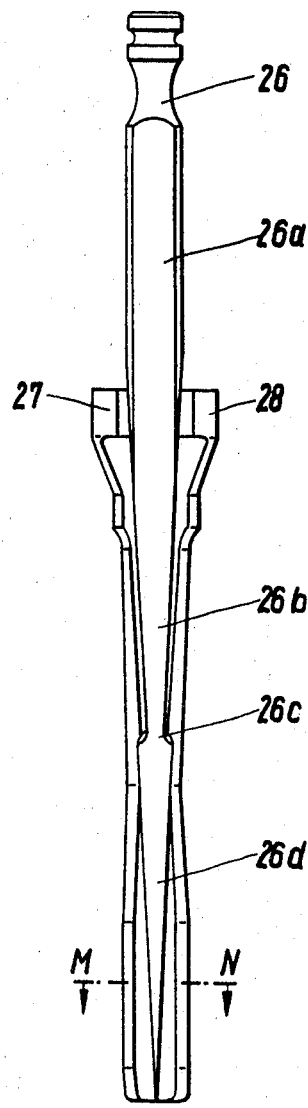
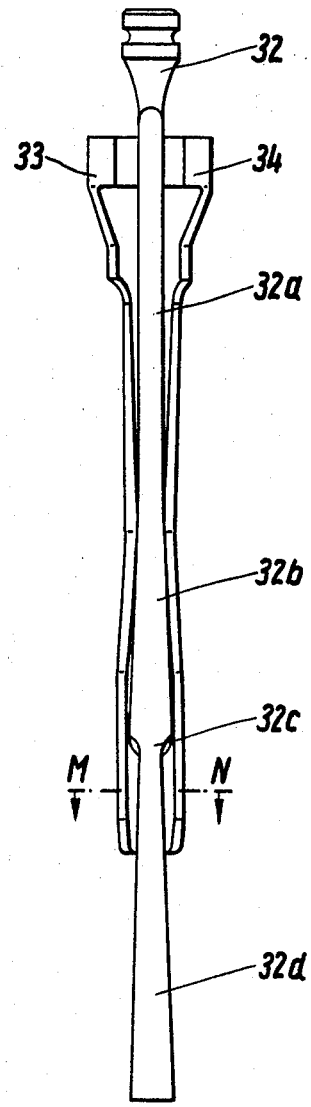

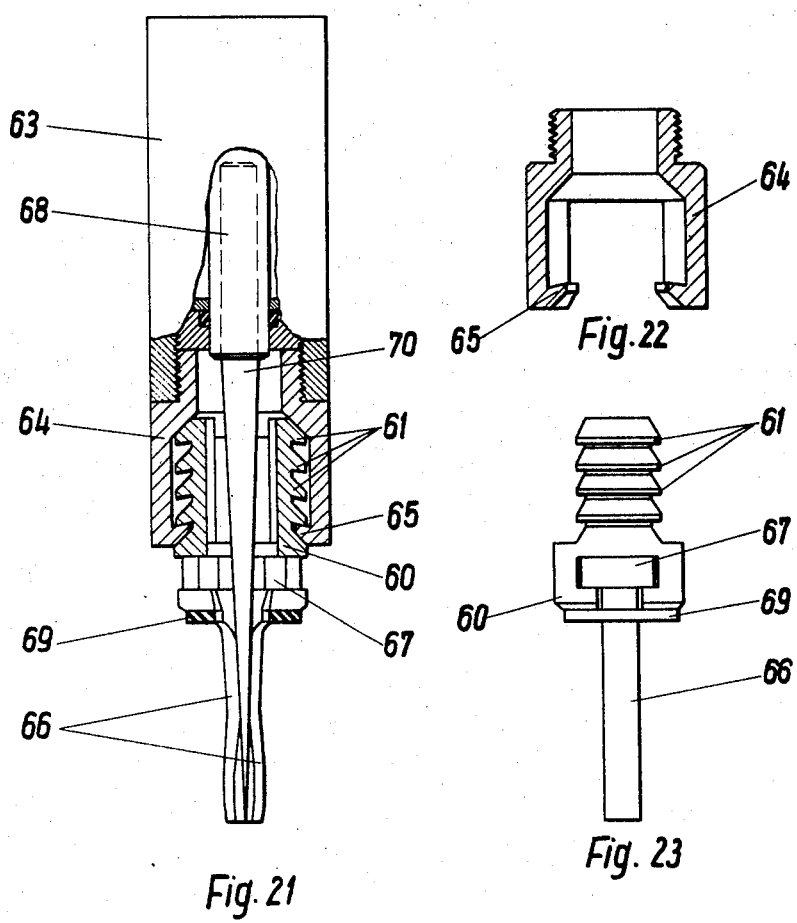

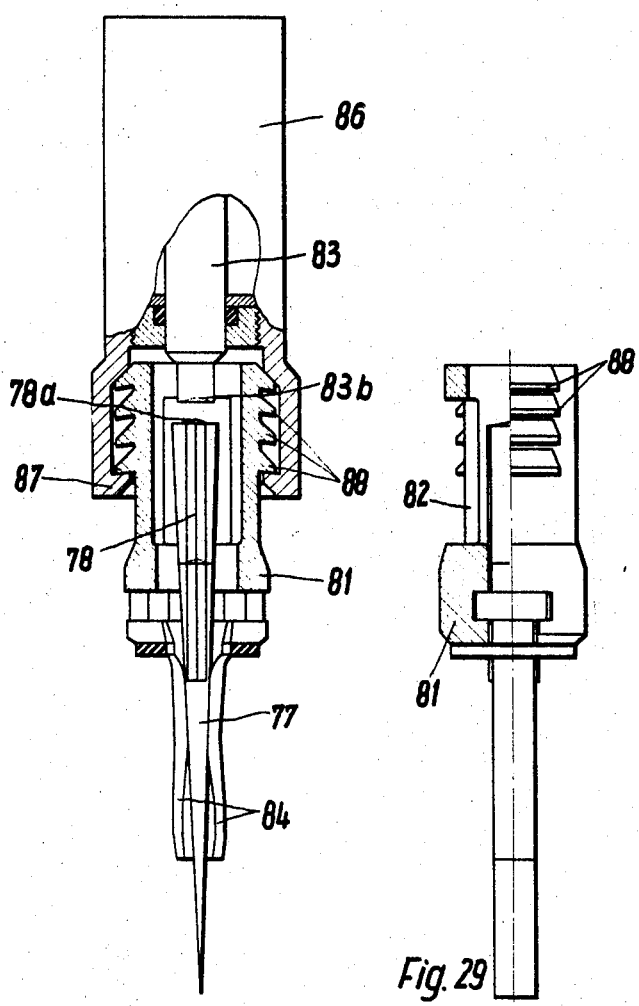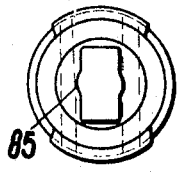

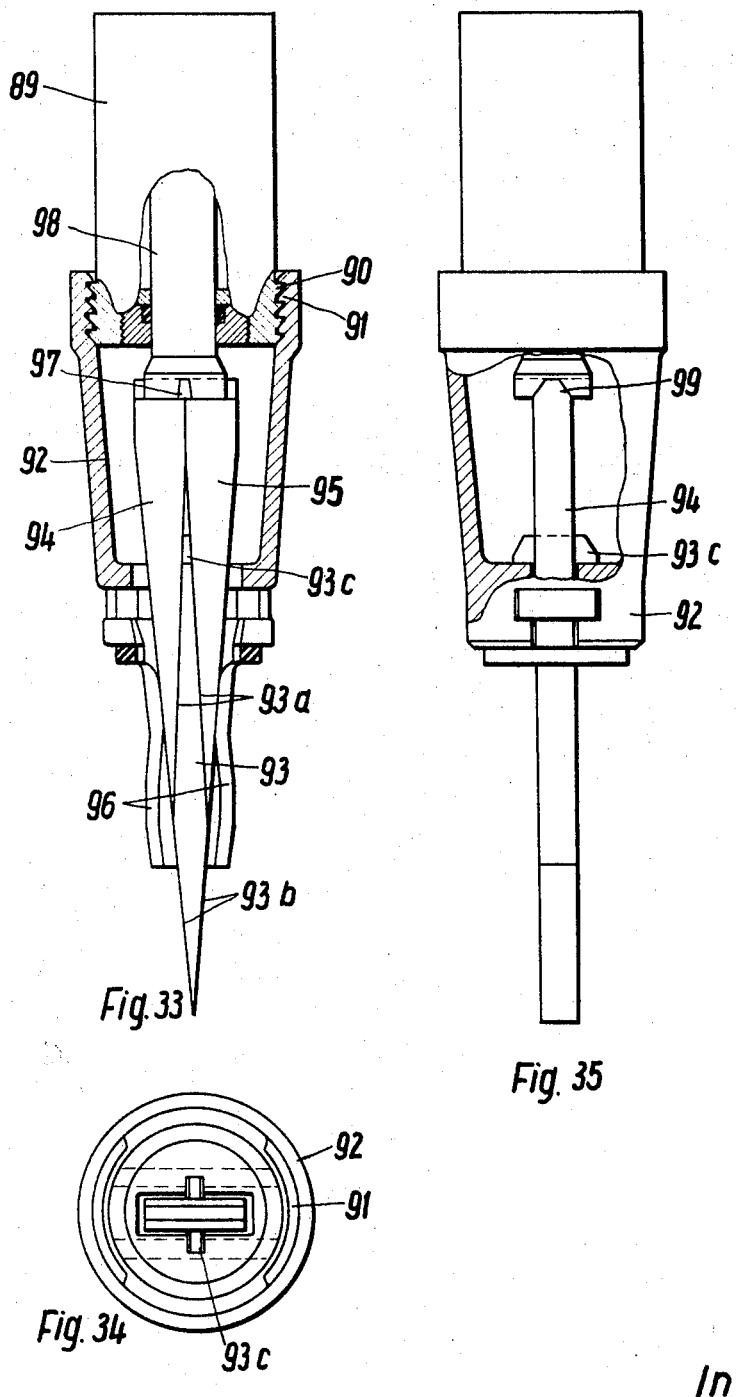

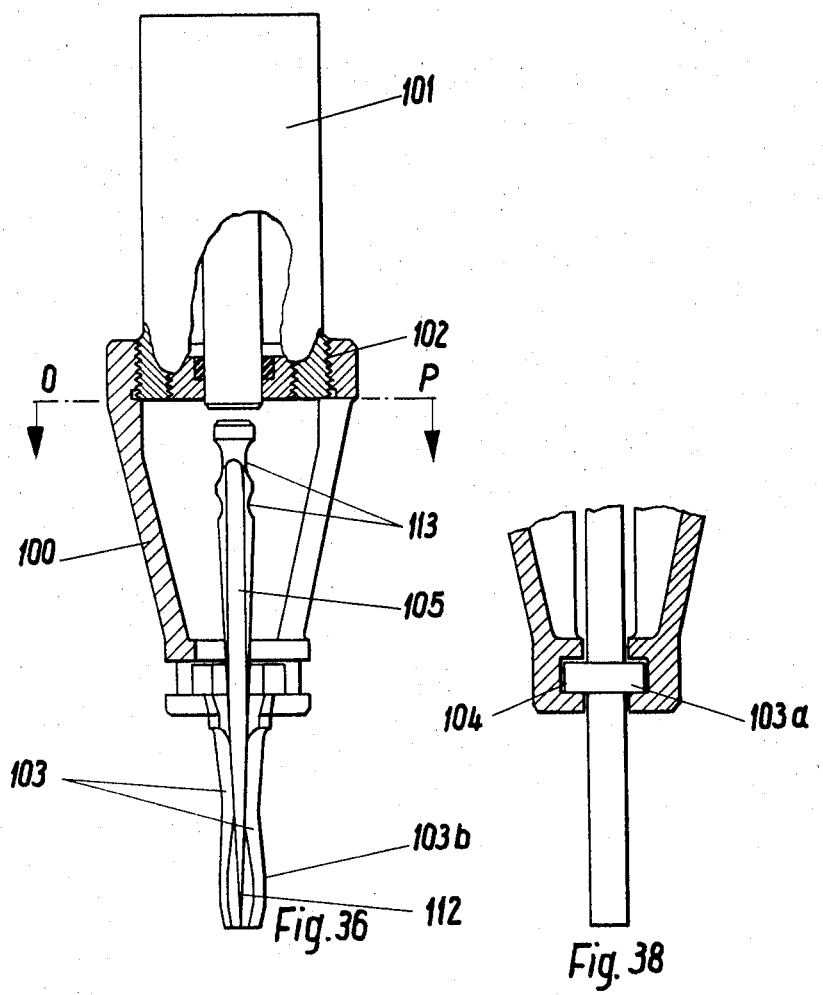

(S-T)

United States Patent Office
3,439,954
Patented Apr. 22, 1969

3,439,954
PRESSURE BREAKER
Helmut Darda, Nordwerk, 7712 Blumberg,
Baden, Germany
Filed June 21, 1967, Ser. No. 648,537
Claims priority, application Germany, Dec. 8, 1966,
D 51,738; Mar. 8, 1967, D 52,469
Int. Cl. E21c 37/02, 37/04, 37/06
U.S. Cl. 299—22                                25 Claims

ABSTRACT OF THE DISCLOSURE

The expander of a pressure breaker comprises two pressure bars which need not be connected with the cylinder of the hydraulic operating means. The piston of the operating means is connected with one of two wedge-like spreaders which are slidable between the pressure bars, and the other spreader is connected with the cylinder by means of motion transmitting members which guide the pressure bars and prevent entry of foreign matter between the abutting surfaces of pressure bars and spreaders. When the pressure bars are inserted into a drill hole, the cylinder is caused to move relative to the piston and the piston is caused to move relative to the pressure bars whereby the spreaders move toward each other and move the pressure bars apart.

Each spreader and/or the pressure bars may be provided with two or more groups of surfaces of different mutual inclination. Also, the length of the spreaders and/or the combined length of the cylinder and pressure bars (in pressure breakers with a single spreader) can be varied and the spreader or spreaders can be caused to perform useful work (i.e., to move the pressure bars apart) while under tensional rather than under compressive stresses.

CROSS-REFERENCE TO RELATED APPLICATION

This invention relates to improvements in pressure breakers disclosed in my copending application Ser. No. 570,353, filed on Aug. 4, 1966 for Hydraulically Actuated Tool for the Mechanical Crushing of Rocks by Means of a Wedge Slidable Through Insert Pieces.

BACKGROUND OF THE INVENTION

The present invention relates to improvements in fluid-operated tools, also called pressure breakers, which are utilized to crack rock or like formations.

It is already known to employ in quarries or mines hydraulically actuated tools which are insertable into drill holes to form cracks in large blocks of rock or ore. As a rule, the formation to be broken up is provided with a series of drill holes located in the plane in which the formation is to be cracked, and the operators drive into such holes suitable wedges to form a fissure. In accordance with a presently preferred procedure, drill holes receive pressure bars with a wedge-like spreader therebetween. When the spreader is moved lengthwise, it acts against the pressure bars and causes them to exert pressure against material which surrounds the drill hole. Such pressure breakers are disclosed, for example, in German Patent No. 960,167 or in U.S. Patent No. 2,385,753.

A serious drawback of presently known pressure breakers is that they cannot be inserted into drill holes of small diameter. The number of man hours and the wear upon drilling tools are directly proportional to the diameter of a drill hole, i.e., it is highly desirable to construct a pressure breaker in such a way that it can form cracks in a formation which is provided with one or more drill holes of small diameter.

In the pressure breaker of the aforementioned U.S. Patent No. 2,385,753, a single wedge-like spreader is separated from the pressure bars by flanged roller bearings which occupy much room and prevent insertion of pressure bars into a small-diameter hole. Furthermore, and in order to successfully withstand stresses which arise when the spreader is shifted relative to the pressure bars, the bearings must be rather large and rugged which also contributes to bulkiness of such pressure breakers. Moreover, the bearings are rapidly damaged or destroyed by dust or other foreign matter which penetrates between the spreader and the pressure bars. It was found that such pressure breakers cannot be used in drill holes which are not absolutely straight. Since the drilling tools are normally held by hand, it happens again and again that the hole is not entirely straight.

My aforementioned copending application Ser. No. 570,353 discloses a hydraulically actuated pressure breaker which constitutes an improvement over the pressure breaker of U.S. Patent No. 2,385,753. The improved pressure breaker need not utilize bearings between the pressure bars and the spreader. However, it was found that my pressure breaker requires further modifications and improvements, particularly as regards its utilization in relatively long drill holes.

SUMMARY OF THE INVENTION

It is an important object of my invention to provide a novel and improved pressure breaker which can be inserted into straight drill holes or into drill holes which are not absolutely straight and which can be inserted into and successfully employed in very long drill holes of small diameter.

Another object of the invention is to provide a pressure breaker which can concentrate the cracking or expanding force in a desired section of the drill hole, which can exert simultaneous pressure against two or more longitudinally spaced portions of material which surrounds the drill hole, whose effective length may be varied at will and within a desired range, and which can be manipulated by persons having little technical skill.

A further object of the invention is to provide a pressure breaker which can exert substantial stresses against the material surrounding a drill hole as soon as its spreader or spreaders begin to move relative to the pressure bars.

An additional object of the invention is to provide a pressure breaker wherein the spreader or spreaders can move the pressure bars apart while being subjected to tensional stresses.

A concomitant object of the invention is to provide a pressure breaker which can utilize spreaders which are much longer than the spreaders of presently known pressure breakers but without necessitating the drilling of large-diameter holes.

A further object of the invention is to provide novel inserts which can be used with heretofore known spreaders to effect further propagation of partial cracks or to form cracks in formations wherein a conventional pressure breaker cannot do the work.

Another object of my invention is to provide a pressure breaker wherein one or more parts can be conveniently and rapidly detached or reapplied without resorting to any tools or by resorting to readily available tools, and wherein individual parts can be replaced without necessitating even partial dismantling of the remaining parts.

Briefly outlined, one feature of my invention resides in the provision of a pressure breaker which can be used to form cracks in rocky or like formations which are provided with drill holes. The pressure breaker comprises an elongated expander having a pair of deformable pressure bars provided with internal surfaces and being insertable into a drill hole, a pair of wedge-like spreaders disposed mirror symmetrically with reference to each other and received between the pressure bars to move them apart in response to movement lengthwise of the expander, and operating means including a fluid-actuated cylinder which is connected with one of the spreaders by means of motion transmitting members which extend into the drill hole and alternate with the pressure bars, and a piston which is reciprocable in the cylinder and is connected with the other spreader. When the piston and the cylinder are caused to move relative to each other and relative to the expander, the two spreaders move toward each other from opposite ends of the expander and cause the pressure bars to move apart in order to exert pressure against the material around the drill hole.

The novel features which are considered as characteristic of the invention are set forth in particular in the appended claims. The improved pressure breaker itself, however, both as to its construction and the mode of assembling and operating the same, together with additional features and advantages thereof, will be best understood upon perusal of the following detailed description of certain specific embodiments with reference to the accompanying drawing.

BRIEF DESCRIPTION OF THE DRAWING

FIG. 1 is an axial sectional view of a pressure breaker with two spreaders which embodies one form of my invention;

FIG. 2 is a side elevational view of the pressure breaker in a position after turning through 90 degrees with reference to the position of FIG. 1 and with the motion transmitting members shown in partial section;

FIG. 3 is a fragmentary axial sectional view of a second pressure breaker with two spreaders;

FIG. 4 is a fragmentary axial sectional view of the right-hand end of the second pressure breaker after turning through 90 degrees with reference to the position shown in FIG. 3;

FIG. 10 is a section as seen in the direction of arrows from the line J–K of FIG. 3;

FIG. 11 is a fragmentary axial sectional view of a first pressure breaker with a single spreader;

FIG. 12 is a transverse sectional view as seen in the direction of arrows from the line M–N of FIG. 11;

FIG. 13 is a fragmentary axial sectional view of a second pressure breaker with a single spreader which constitutes a modification of the tool shown in FIGS. 11 and 12;

FIG. 14 is a transverse sectional view as seen in the direction of arrows from the line M–N of FIG. 13;

FIG. 15 is a fragmentary axial sectional view of a third pressure breaker with a single spreader wherein the spreader is subjected to tensional stresses when it causes the pressure bar of the expander to move away from each other;

FIG. 16 is a transverse sectional view as seen in the direction of arrows from the line M–N of FIG. 15;

FIG. 17 is a fragmentary axial sectional view of a fourth pressure breaker with a single spreader;

FIG. 18 is a transverse sectional view as seen in the direction of arrows from the line M–N of FIG. 17;

FIG. 19 is a fragmentary axial sectional view of a fifth pressure breaker with a single spreader;

FIG. 20 is a transverse sectional view as seen in the direction of arrows from the line M–N of FIG. 19;

FIG. 21 is a partly elevational and partly sectional view of a sixth pressure breaker with a single spreader wherein the combined length of the cylinder and expander can be varied and wherein the spreader and the pressure bars of the expander are readily separable from the operating means;

FIG. 22 is an axial sectional view of a portion of the cylinder in the pressure breaker of FIG. 21;

FIG. 23 is a side elevational view of pressure bars and of an extension which forms part of a connecting device between the expander and the cylinder of the operating means;

FIG. 24 is a top plan view of the structure shown in FIG. 23;

FIG. 28 is a partly elevational and partly axial sectional view of an eighth pressure breaker with a single spreader wherein the operating means comprises a one-piece cylinder;

FIG. 29 is a partly elevational and partly axial sectional view of the structure shown in the lower part of FIG. 28 but turned through 90 degrees;

FIG. 30 is a top plan view of the structure shown in FIG. 29;

FIG. 31 is an exploded side elevational view of a composite spreader which can be used in the tool of FIG. 28;

FIG. 32 is a top plan view of the spreader shown in FIG. 31;

FIG. 33 is a partly elevational and partly axial sectional view of a ninth pressure breaker which can utilize a differently constructed composite spreader;

FIG. 34 is a top plan view of the tool shown in FIG. 33 but with the operating means omitted;

FIG. 35 is a view as seen from the left-hand side of FIG. 33 but with portions of the pressure breaker broken away;

FIG. 36 is a partly elevational and partly axial sectional view of a tenth pressure breaker with a single spreader;

FIG. 37 is a transverse sectional view as seen in the direction of arrows from the line O–P of FIG. 36;

FIG. 38 is a sectional view of the lower part of the tool shown in FIG. 36 but turned through 90 degrees;

DESCRIPTION OF THE PREFERRED EMBODIMENTS

Figure 5:
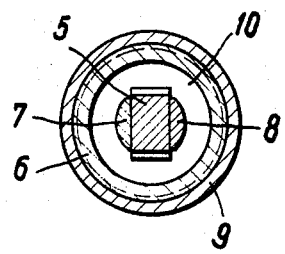
FIG. 5 is a transverse sectional view as seen in the direction of arrows from the line A–B of FIG. 1.

Referring first to FIGS. 1 and 2, there is shown a pressure breaker adapted to be utilized for cracking of rocky or like formations which are provided with drill holes. The pressure breaker comprises a composite double acting hydraulic cylinder including a first cylindrical portion 1 and a second cylindrical portion 6 which latter resembles a sleeve and is provided with external threads meshing with internal threads at the open end of the first cylindrical portion 1. The cylindrical portion 1 accommodates a piston 2 which is reciprocable therein and is connected with a piston rod 3. The free end of the piston rod 3 accommodates a ball bearing 4 for the left-hand end of a wedge-like spreader 5. The spreader 5 tapers in a direction away from the cylinder.

The open end of the cylindrical portion is detachably connected with two slender motion-transmitting members 7 and 8 (see also FIG. 5) each of which has an enlargement or head received in a suitable socket provided therefor in the cylindrical portion 6. The open end of the cylindrical portion 6 further accommodates a ring 10 of rubber or like elastomeric material which is held therein by a cap 9. The ring 10 surrounds the spreader 5 and the motion-transmitting members 7, 8 and serves to strip off foreign matter from such portions of these parts which are movable with reference to the cylindrical portion 6. The purpose of the motion-transmitting members 7, 8 is to connect the cylinder including the portions 1 and 6 with a second wedge-like spreader 11 which is mirror symmetrical with reference to the spreader 5. In the embodiment of FIGS. 1 and 2, the motion-transmitting members 7, 8 are constituted by two separate parts and their end portions which are remote from the cylinder are connected to each other by a screw 12 or an analogous fastener. These end portions of the members 7, 8 together define a socket (clearly shown in FIGS. 1 and 2) which accommodates a plug 11a at the adjoining end of the spreader 11.

Figure 6:
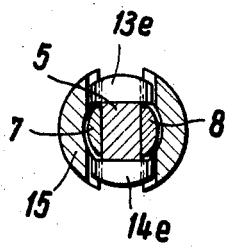
FIG. 6 is a transverse sectional view as seen in the direction of arrows from the line C–D of FIG. 1.

The pressure breaker further comprises an elongated expander which includes two pressure bars 13, 14 and a ring-shaped connecting member 15. The pressure bars 13, 14 are respectively provided with enlargements or heads 13e, 14e (see FIGS. 2 and 6) received in sockets 15a provided therefor in the periphery of the connecting member 15. Thus, the heads 13e, 14e can be readily detached from the connecting member 15. Those end portions of the bars 13, 14 which are remote from the cylinder including the portions 1 and 6 are connected to each other by resilient connecting means 18 shown in the right-hand portion of FIG. 1 and in FIG. 9. The connecting member 15 is movable axially of the motion-transmitting members 7, 8 and spreader 5. The sockets 15a of this connecting member resemble T-shaped grooves and are open laterally so that the respective heads 13e, 14e can be readily inserted into or withdrawn from such sockets. The expander further comprises a ring-shaped retaining member 17 of rubber or other suitable elastomeric material which serves to maintain the heads 13e, 14e in the respective sockets 15a. The retaining ring 17 can be slipped onto the pressure bars 13, 14 in a direction from the right-hand toward the left-hand end of FIG. 1 or 2.

The connecting member 15 of the aforementioned expander is further provided with a plurality of transversely extending substantially semicircular cutouts or holes 15b which are shown in FIGS. 1 and 10. These cutouts 15b can be placed into registry with complementary cutouts 5a (see FIG. 3) so that the cutouts 5a form with the adjoining portions of cutouts 15b cylindrical passages for insertion of two parallel posts 16 forming part of a coupling device which is illustrated in FIG. 10. The posts 16 are connected to each other by a crosshead 16a which carries a handle 16b so that the coupling device can be readily attached to or detached from the connecting member 15. In the embodiment which is illustrated in FIG. 10, the posts 16 serve to establish a separable connection between the expander and the spreader 5. However, it is equally within the purview of this invention to establish a separable connection between the spreader 11 and the pressure bars 13, 14 of the expander or to connect the expander with the motion-transmitting members 7, 8. When the coupling device 16–16b connects the expander with the spreader 5, and when the pressure breaker of my invention is put to use, the spreader 5 cannot move with reference to the pressure bars 13, 14 but the spreader 11 can be shifted in a direction toward the piston 2 so as to engage the adjoining group of internal surfaces on the pressure bars 13, 14 and to move portions of the pressure bars away from each other in order to exert pressure upon the material which surrounds the bore hole wherein the expander is received. Such immobilization of the spreader 5 is desirable when the formation which is to be cracked is partially split at the outer end of the bore hole, i.e., when it is necessary to further propagate a partial crack which is already provided in the formation.

Figure 9:
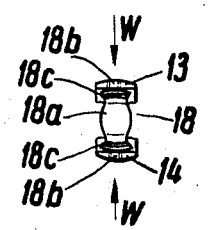
FIG. 9 is a view as seen in the direction of the arrow L shown in FIG. 3.

The aforementioned resilient connecting means 18 between the right-hand end portions of the pressure bars 13, 14 is illustrated in greater detail in FIG. 9. This connecting means comprises an elastic core 18a which is preferably made of rubber and each end of which is vulcanized to a disc 18c. Each of these discs 18c meshes with the stem of a screw 18b. The threads of one of the screws 18b are right-hand threads whereas the threads of the other screw are left-hand threads. The purpose of the connecting means 18 is to urge the free end portions of the pressure bars 13, 14 toward each other, i.e., to reduce the transverse dimension of the expander in response to return movement of the spreader 11 to its starting position. The directions in which the connecting means 18 biases the free end portions of the pressure bars 13, 14 are indicated in FIG. 9 by arrows W.

Each of the pressure bars 13, 14 is provided with two mutually inclined internal surfaces which are respectively engaged by the adjoining external surfaces of the spreader 5 or 11. The internal surfaces which engage with the spreader 5 converge in a direction away from the cylinder and the internal surfaces which are engaged by the spreader 11 converge in a direction toward the cylinder. In addition, the pressure bars 13, 14 are provided with reinforced portions 13a, 13b and 14a, 14b which are adjacent to the respective internal surfaces. The internal surfaces which are engaged by the spreaders 5 and 11 are preferably coated with layers 13c, 13d and 14c, 14d of wear-resistant material, preferably metal. The reinforced portions 13a, 13b and 14a, 14b of the pressure bars 13, 14 serve to enhance the spreading or cracking action of the pressure breaker when the latter is put to actual use, namely, when the spreaders 5 and 11 are caused to move toward each other. The layers 13c, 13d and 14c, 14d prevent excessive wear on the pressure bars 13, 14 in response to repeated reciprocation of the spreaders.

Referring now to FIGS. 3, 4, 7 and 8, there is shown a portion of a modified pressure breaker which comprises a rod composed of two motion transmitting members 7', 8' and having a cylindrical end portion 19 remote from the cylinder. The end portion 19 has an axial bore which constitutes a socket for a plug 11'a of a wedge-like spreader 11' corresponding to the spreader 11 of FIG. 1. The plug 11'a is held in position by a nut 20 which is traversed by an arresting pin 21. The dimensions of the nut 20 are such that it can be readily fitted between the end portions of the pressure bars 13, 14.

The pressure breaker of FIG. 1 or 3 is operated as follows:

FIG. 1 illustrates the pressure breaker in a starting or idle position. The pressure bars 13, 14 are introduced into a bore hole (not shown) and such bore hole also accommodates the motion-transmitting members 7, 8 and spreaders 5 and 11. The cylindrical portion 1 then receives a hydraulic pressure medium through a non-illustrated inlet so that the piston 2 is caused to move in a direction to the right whereas the cylinder including the portions 1 and 6 moves in a direction to the left, as viewed in FIG. 1. The piston rod 3 of the piston 2 displaces the spreader 5 whose tapering portion penetrates between the reinforced portions 13a, 14a of the pressure bars 13, 14 whereby the expander bears against the material which surrounds the bore hole. As the cylinder including the portions 1 and 6 advances in a direction to the left, it entrains the motion-transmitting members 7, 8 and the spreader 11 which latter advances toward the spreader 5 whereby the spreader 11 moves the reinforced portions 13b, 14b apart. Thus, the pressure breaker can expand two longitudinally spaced portions of an expander so that the breaker will cause the material of the formation to crack in the regions adjacent to the inner and outer ends of the bore hole.

The spreader 5 will be coupled to the pressure bars 13, 14 of the expander by means of the coupling device 16–16b shown in FIG. 10 when the formation is already cracked or split adjacent to the outer end of the bore hole so that it is only necessary to propagate the crack all the way through the formation. The entire hydraulic force is then transmitted to the spreader 11 and the latter performs a stroke which is twice the stroke of the spreader 11 when the pressure breaker is caused to move the spreaders 5, 11 simultaneously. In order to disengage the expander from the material, it is nececssary to admit pressure medium to the right-hand side of the piston 2, as viewed in FIG. 1, so that the piston travels in a direction to the left and the cylinder including the portions 1 and 6 travels in a direction to the right. The spreaders 5 and 11 are then retracted to their original or starting positions. The movement is arrested when the cylindrical portion 6 engages the connecting member 15.

Figure 7:
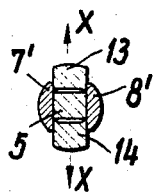
FIG. 7 is a transverse sectional view as seen in the direction of arrows from the line E–F of FIG. 3.
Figure 8:
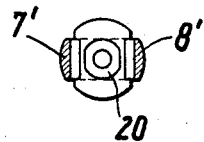
FIG. 8 is a transverse sectional view as seen in the direction of arrows from the line G–H of FIG. 4.

As clearly shown in FIG. 7, the parts 13, 14 and 7', 8' together form a substantially cylindrical body which can nearly completely fill a drill hole. The aforementioned internal surfaces of the pressure bars 13, 14 are protected against entry of foreign matter between such surfaces and the respective spreaders 5, 11 or 5, 11' by the motion-transmitting members 7', 8'. Furthermore, the motion-transmitting members 7', 8' compel the pressure bars 13, 14 to move radially toward or away from each other. In other words, the members 7', 8' prevent undesirable deformation of the pressure bars when the spreaders 5, 11 or 5, 11' are caused to move toward each other. The directions in which the bars 13, 14 can move away from each other are indicated in FIG. 7 by arrows X.

The angle between the external surfaces of the spreader 5, 11 or 11' can be a relatively large angle to reduce friction. It will be noted that, contrary to the design of presently known pressure breakers, the expander 13–15 need not be connected with the cylinder. The members 7, 8 or 7', 8' are subjected only to tensional stresses so that each thereof can resemble a slender strip of metallic material. When the pressure breaker is in use, the members 7, 8 or 7', 8' slide along the surface surrounding the drill hole and are properly guided during movement with the spreader 11 or 11'. In other words, the motion transmitting members need not be dimensioned to exhibit a substantial bending strength. In addition to preventing entry of foreign matter into the expander 13–15, the members 7, 8 or 7', 8' also prevent escape of lubricant which is applied to the internal surfaces of the pressure bars and to the surfaces of the spreaders.

In the embodiments of FIG. 1–10, the motion transmitting members 7, 8 or 7', 8' alternate with the pressure bars 13, 14 and form therewith a substantially rod-shaped assembly which can be tightly fitted into a drill hole to insure that the material of the formation which surrounds the hole will be subjected to pressure as soon as the spreaders 5, 11 or 5, 11' begin to move toward each other.

An advantage of the construction shown in FIGS. 1 and 2 is that the two discrete motion transmitting members 7, 8 can be produced in simpler machinery. Furthermore, a damaged or destroyed motion transmitting member 7 or 8 can be replaced by a spare member whereas the member 7' must be discarded if the member 8' is damaged, or vice versa.

The purpose of the elastic connecting means 18 is to draw the free ends of the pressure bars 13, 14 together and to insure that these bars remain attached to each other even if the head 13e or 14e is withdrawn from the respective socket 15a.

The provision of registering cutouts 5a, 15b in the spreader 5 and connecting member 15 is desirable not only to permit temporary coupling of the spreader 5 with the expander 13–15 but also to enhance the elasticity of the spreader 5 in the region where the latter is subjected to maximum bending stresses.

An important feature of pressure breakers shown in FIGS. 1–10 is that they can be introduced into relatively long drill holes without necessitating the drilling of large-diameter holes. The motion transmitting members 7, 8 or 7', 8' are slender and take up little room.

FIGS. 11 to 20 illustrate five embodiments of a second type of pressure breaker which comprises a single wedge-like spreader. The operating means including the piston and the cylinder were omitted for the sake of clarity. The piston is connected to the spreader and the cylinder is connected to the pressure bars of the expander. It goes without saying that the features embodied in the pressure breakers of FIGS. 11 to 20 can be incorporated in the pressure breaker of FIGS. 1–2 or 3–4.

A feature common to all of the five embodiments which are illustrated in FIGS. 11 to 20 is that the spreader is invariably provided with two or more groups of external surfaces and that the mutual inclination of external surfaces in one group is different from the mutual inclination of surfaces in another group. The same holds true for the internal surfaces of the pressure bars. Furthermore, the cross-sectional area of that end of each spreader which is connected to the piston (this is the upper end of the spreader shown in FIG. 11, 13, 15, 17 or 19) is smaller than if the spreader would taper continuously from its tip towards the piston.

Referring to FIGS. 11 and 12 in greater detail, the spreader 22 comprises an upper end portion which can be coupled to the piston of the operating means in the same way as shown for the spreader 5 of FIG. 1. This spreader 22 comprises three longitudinally spaced portions or sections including an end portion or tip 22c which is bounded by a pair of external surfaces tapering in a direction away from its upper end, i.e., away from the operating means, and intermediate section or portion 22b which is bounded by two parallel external surfaces, and an upper portion or section 22a which is bounded by two external surfaces tapering in the same direction as the surfaces of the end portion 22c. The pressure bars 23, 24 comprise a first pair of internal surfaces provided on their end portions 23b, 24b which taper in the same direction as the external surfaces of the end portion 22c, and these bars also comprise second portions or sections 23a, 24a having internal surfaces which are parallel to each other when the expander including the pressure bars 23, 24 is in undeformed state. The portions 23a, 24a then abut against the external surfaces of the second portion 22b of the spreader 22, and the portions 23b, 24b of the pressure bars bear against the external surfaces of the end portion 22c. The pressure bars are preferably made of elongated blanks which are deformed on heating so that they follow the outline of the corresponding portions of the spreader 22. The internal surfaces of the aforementioned blanks are straight.

FIGS. 13 and 14 illustrate a portion of a second pressure breaker which constitutes a simplified modification of the pressure breaker shown in FIGS. 11 and 12. The spreader 25 has an upper end portion which can be coupled to the piston of the operating means, a lower end portion or tip 25b which is bounded by two external surfaces tapering in a direction away from the operating means, and a further portion 25a which is disposed between the piston of the operating means and the end portion 25b and is bounded by two parallel external surfaces. Thus, the spreader 25 is not provided with a third portion such as would correspond to the portion 22a of the spreader 22 shown in FIG. 11. The pressure bars 23', 24' of FIGS. 13 and 14 are identical with the pressure bars 23, 24.

In the embodiment of FIGS. 17 and 18, the spreader 26 comprises a lower end portion 26d which is bounded by a group of surfaces tapering in a direction away from the operating means (not shown), an intermediate portion or second portion 26b which is separated from the end portion 26d by a neck portion 26c and is bounded by two external surfaces tapering in the same direction as the external surfaces of the end portion 26d, and an upper end portion 26a which is bounded by two parallel external surfaces. An important advantage of the spreader 26 is that its transverse dimensions do not exceed a maximum permissible value, i.e., the diameter of the drill hole. In other words, the transverse dimensions of the upper end portion 26a are smaller than if the spreader 26 would taper gradually all the way from its lower end toward the point of connection with the piston. The internal surfaces of the pressure bars 27, 28 shown in FIGS. 17 and 18 are configurated in such a way that they abut against the adjoining external surfaces of the spreader when the latter is held in the starting position.

FIGS. 15, 16 and 19, 20 illustrate portions of two pressure breakers wherein the spreaders cause deformation of the respective expanders when they move upwardly, as viewed in these illustrations, namely, in a direction toward the cylinder of the operating means. The spreader 29 of FIG. 15 has a lower end portion 29b bounded by two external surfaces which taper in a direction toward the operating means, i.e., upwardly. The second portion 29a of the spreader 29 is bounded by two parallel external surfaces. The pressure bars 30, 31 of the structure shown in FIGS. 15 and 16 are provided with internal surfaces which abut against the corresponding external surfaces of the spreader 29 when the pressure breaker is idle. It will be seen that the structure of FIGS. 15 and 16 is a functional equivalent of the structure shown in FIGS. 13 and 14.

The structure shown in FIGS. 19 and 20 is a functional equivalent of the structure illustrated in FIGS. 17 and 18. The spreader 32 has a lower end portion 32d which is bounded by two external surfaces tapering in a direction toward the operating means (not shown), an intermediate portion 32b which is separated from the end portion 32d by a neck portion 32c and is bounded by two external surfaces which taper upwardly, as viewed in FIG. 19, and a further portion 32a which is bounded by two parallel external surfaces. The pressure bars 33, 34 have internal surfaces which abut against the adjoining external surfaces of the spreader 32 when the latter is held in starting position. An important advantage of the structure shown in FIGS. 19 and 20 is seen to reside in that the transversal dimensions of the spreader 32 are less than if the spreader would taper all the way from its lower end to the point of connection with the piston of the operating means.

The embodiments of FIGS. 11–20 solve the problem of effecting substantial widening of the expander in a small-diameter drill hole. This is achieved by imparting to the spreader and/or pressure bars such configuration that the external surfaces of the spreader and/or the internal surfaces of the pressure bars are arranged in two or more longitudinally spaced groups in each of which the mutual inclination of internal or external surfaces is different from the inclination of surfaces in at least one other group. Thus, and if the spreader is provided with two or more groups of external surfaces which are inclined in a manner as shown in FIGS. 11–20, the diameter of the drill hole will be much less than if the spreader were to taper continuously from its tip and all the way to the point of connection with the piston or piston rod.

In the embodiment of FIGS. 11 and 12, the pressure bars 23, 24 will exert different pressures in different axial positions of the spreader 22. Furthermore, the pressure exerted against the surrounding material will be different along different longitudinally spaced sections of the drill hole. The spreader 22 can be made much longer than in heretofore known pressure breakers and the parts 22–24 can be inserted into a relatively long drill hole of small diameter.

An unobvious advantage of the embodiments shown in FIGS. 15–16 and 19–20 is that the spreader 29 or 32 performs useful work while it is subjected to tensional, rather than compressive, stresses. This is important when the pressure breaker is used to crack very hard rock or the like. To my knowledge, all presently known pressure breakers operate in such a way that their spreaders are subjected to compressive stresses, i.e., that the tip of the spreader is the leading end when the spreader is caused to move the pressure bars apart.

As stated before, the pressure bars are preferably made of blanks with straight internal surfaces, and the blanks are deformed upon heating to follow the outline of the spreader. Such mode of producing the pressure bars is desirable because there is no interruption in the texture of the material of which the pressure bars consist. Since the pressure bars follow the outline of the spreader when the latter is held in idle or starting position, they occupy little room and can be fitted into drill holes of small diameter. The elasticity of pressure bars is sufficient to prevent the formation of gaps between the pressure bars and the spreader when the latter is moved from starting position, i.e., the pressure bars will move apart but will continue to follow the outline of the spreader wherever possible. This insures that dust or other foreign matter cannot penetrate between the pressure bars and the spreader and that lubricant remains entrapped between such parts.

FIGS. 21 to 41 illustrate a series of pressure breakers which are constructed and assembled in accordance with a third feature of my invention. In each of these embodiments, the expander is detachably connected with the cylinder unit of the operating means or the spreader is detachably connected with the piston unit of the operating means.

Referring first to FIGS. 21 and 24, there is shown a pressure breaker which comprises a cylinder unit composed of a block 63 which receives a reciprocable piston (not shown) having a piston rod 68, and an adapter 64 which is threadedly connected with the cylinder block 63. The adapter 64 constitutes one portion of the connecting device which secures an expander having pressure bars 66 to the cylinder block 63. Another portion of the connecting device comprises an extension 60 having external projections in the form of jaws or teeth 61 which can engage with two inwardly extending projections or teeth 65 provided at the lower end of the adapter 64. As shown in FIG. 24, the extension 60 is formed with two axially extending clearances or gaps 62 which separate the two groups of teeth 61 from each other. The teeth 61 are disposed in pairs at different axial distances from the pressure bars 66. In order to attach the pressure bars 66 to the cylinder block 63, the operator will introduce the teeth 65 of the adapter 64 into the gaps 62 of the extension 60, and the extension is then rotated with reerence to the block 63 in order to place a selected pair of its teeth 61 into engagement with the teeth 65 of the adapter 64. Each tooth 61 preferably extends through an angle of 90° (see FIG. 24). The pressure bars 66 have heads 67 (shown in FIG. 23) which are receivable in sockets provided therefor in the extension 60. The sockets for the heads 67 resemble T-shaped grooves. By placing the teeth 65 of the adapter 64 into engagement with a selected pair of teeth 61 on the extension 60, the operator can increase or reduce the distance between the upper end of the cylinder block 63 and the pressure bars 66. An elastic retaining ring 69 surrounds the pressure bars 66 directly below the extension 60 so as to hold their heads 67 in the respective sockets.

The wedge-like spreader 70 has an upper end portion which is insertable into a blind bore provided in the lower end of the piston rod 68. This blind bore communicates with a radial slot through which the upper end portion of the spreader 70 can be inserted or withdrawn when the piston rod is moved to its lower end position. It is to be noted that FIG. 21 illlustrates the piston rod 68 in its upper end position. The spreader 70 is provided with at least one pair of external surfaces which taper downwardly and away from the cylinder block 63 and are received between complementary internal surfaces of the pressure bars 66 so that these bars move apart when the piston performs a downward stroke.

The pressure breaker of FIGS. 21 to 24 can be operated in the following way:

The heads 67 of the pressure bars 66 are introduced into a drill hole formed in a rocky or like formation which is to be cracked by the pressure breaker. The diameter of the drill hole is such that it reecives the pressure bars 66 with minimal clearance. The spreader 70 is inserted between the pressure bars 66 but is held in the starting position shown in FIG. 21. The cylinder block 63 is then connected with the extension 60 by placing the teeth 65 of the adapter 64 into registry with the gaps 62 and the block 63 is moved downwardly, as viewed in FIG. 21, until the top face of the spreader 70 abuts against the bottom surface in the blind bore of the piston rod 68. The block 63 is then rotated with reference to the extension 60 whereby the teeth 65 enter into the spaces between the adjoining teeth 61 so as to establish a separable connection between the cylinder block and the extension. On admission of hydraulic pressure medium into the upper chamber of the cylinder block 63, the piston causes the piston rod 68 to move downwardly and to force the spreader 70 into the space between the pressure bars 66 whereby these bars move apart and stress the material around the drill hole. Since the pressure bars 66 are received in the drill hole with minimal clearance, the expansion or cracking of the formation begins as soon as the spreader 70 starts to move downwardly.

Figure 25:
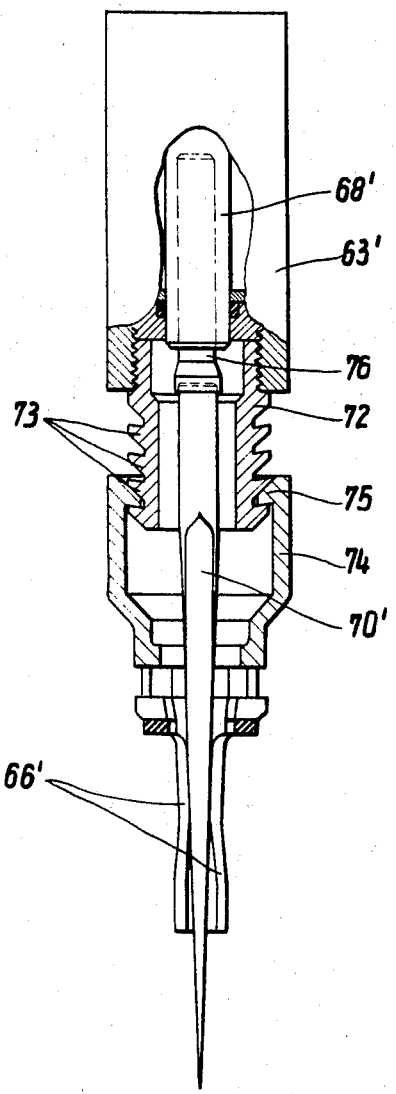
FIG. 25 is a partly elevational and partly sectional view of a seventh pressure breaker with a single spreader which constitutes a modification of the tool shown in FIG. 21.
Figure 26:
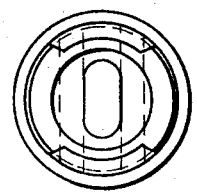
FIG. 26 is a top plan view of an extension forming part of a connecting device between the pressure bars and the cylinder of the pressure breaker shown in FIG. 25.
Figure 27:
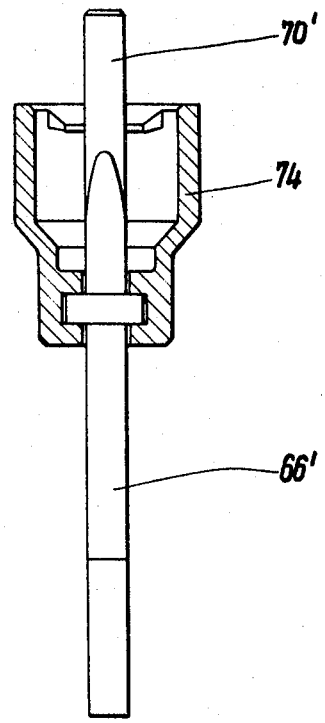
FIG. 27 is an axial sectional view of the lower portion of the pressure breaker but taken in a plane which is normal to the plane of FIG. 25.

FIGS. 25 to 27 illustrate a modification of the pressure breaker shown in FIG. 21. The cylinder block 63' is connected with an adapter 72 having pairs of external projections or teeth 73 which can be placed into engagement with inwardly extending projections or teeth 75 provided on an extension 74 which carries two pressure bars 66'. The heads of pressure bars 66' are received in sockets provided therefor in the extension 74. The spreader is shown at 70'. This spreader can be connected with the piston rod 68' in the same way as described in connection with FIGS. 21 to 24.

FIG. 25 further illustrates the manner in which the spreader 70' can be moved through distances of desired length. In this embodiment of my invention, the blind bore of the piston rod 68' can receive a pin 76 whose lower end is formed with a shallow recess to receive the upper end portion of the spreader 70'. The pin 76 can be inserted upon completion of a downward stroke by the piston rod 68' and upon subsequent retraction of the piston rod to the position shown in FIG. 25. When the piston rod 68' is thereupon caused to perform a downward stroke, the pin 76 drives the spreader 70' deeper between the pressure bars 66' to effect further deformation of the expander. The pin 76 will be employed whenever the deformation of bars 66' in response to a downward stroke of the piston rod 68' does not suffice to crack the formation. It is clear that the pin 76 can be replaced by a pin of greater or lesser length or that the operator can employ a succession of such pins. For example, once the pin 76 has been advanced into the interior of the adapter 72 and assuming that the formation is still intact, the operator will return the piston rod 68' to its upper end position and will employ a second pin similar to or longer or shorter than the pin 76. The parts 70', 76 form two sections of a composite spreader.

FIGS. 28 to 32 illustrate a further modification of the pressure breaker shown in FIGS. 21 to 24. This pressure breaker also utilizes a composite spreader which is assembled of a series of portions or sections arranged end-to-end and clearly shown in FIG. 31. For example, the spreader may comprise a total of four sections 77, 78, 79, 80. An extension 81 is provided with a window 82 through which successive sections of the spreader can be introduced and coupled to each other as well as to the piston rod 83. The piston rod 83 is reciprocable with its piston in a cylinder block 86. In this embodiment of my invention, the connecting device between the piston block 86 and the pressure bars 84 of the expander comprises the aforementioned extension 81 and the lower portion of the block 86. The extension 81 has several pairs of external projections or teeth 88 which can engage with inwardly extending projections or teeth 87 at the lower end of the cylinder block 86 substantially in the same way as described in connection with FIGS. 21 to 27.

Each section of the spreader tapers in the same direction so that the transverse dimensions of the composite spreader increase in response to addition of one or more sections to the first section 77. This is clearly shown in FIG. 31. Consequently, and when the spreader is driven into the space between the pressure bars 84, these pressure bars are caused to move apart and to exert a requisite pressure against the material of the formation which surrounds the drill hole. In order to insure that the sections of the spreader will adhere to each other in response to or subsequent to cracking of the formation, their ends 77a, 78a, 79a and 80a are preferably made of magnetic material. In other words, the abutting ends of the sections of the spreader are caused to stick to each other even if no pressure is exerted against the rearmost section 80. Furthermore, and as shown in FIGS. 31 and 32, the larger-diameter end of each section is preferably provided with a relatively short pyramidal or conical protuberance which enters a shallow depression or recess 78b, 79b, 80b of the adjoining section. The piston rod 83 is also provided with a depression 83b which can receive the protuberance at the upper end 80a of the section 80.

The sections of the spreader are further provided with laterally extending guide cams 77c to 80c which can slide in channels 85 provided in the bottom wall of the extension 81.

It will be noted that the teeth 87 shown in FIG. 28 are integral with the cylinder block 86, i.e. that the adapter 64 of FIG. 21 has been dispensed with. The teeth 87 can engage a selected pair of external teeth 88 on the extension 81.

FIGS. 33 to 35 illustrate a further pressure breaker which comprises a cylinder block 89 having external teeth 90 meshing with internal teeth 91 at the upper end of an extension 92 which carries two pressure bars 96. If desided, the projections 90, 91 can be replaced by threads provided on the cylinder block 89 and extension 92 to engage in the same way as described in connection with the preceding illustrations. The connecting device which includes the teeth 90, 91 resembles a bayonet lock.

The spreader of the pressure breaker shown in FIGS. 33 to 35 comprises two sections including a leading section 93 which is first to be driven into the space between the pressure bars 96 and is bounded by external surfaces 93b which taper away from the cylinder block 89. The second section of the spreader comprises two wedge-like parts 94, 95 each of which can be detachably secured to the piston rod 98. The latter has a transversely extending cutout 97 which can receive a head 93c provided on the section 93. Once the section 93 is driven into the space between the pressure bars 96, the piston rod 98 can be withdrawn and is then connected with the parts 94, 95 which are formed with internal surfaces tapering in the same way as the external surfaces 93a of the section 93. Thus, when the piston rod 98 performs the next working stroke, the parts 94, 95 wedge themselves into the spaces between the surfaces 93a and the pressure bars 96 to bring about further separation of pressure bars and to insure that the formation will crack. As shown in FIG. 35, the lower end portion of the piston rod 98 is provided with a second transverse slot which receives the upper end portions 99 of the parts 94, 95. The second slot of the piston rod 98 preferably extends at right angles to the cutout 97. When the parts 94, 95 are caused to penetrate into the space between the pressure bars 96, the head 93c of the section 93 bears against the bottom wall of the extension 92. Therefore, the internal surfaces of the parts 94, 95 then slide along the external surfaces 93a of the section 93 and cause further expansion of the pressure bars 96.

FIGS. 36 to 38 illustrate a simplified construction of the pressure breaker which was described in connection with FIGS. 33 to 35. This tool comprises a cylinder block 101 which is connected with an extension 100 by means of threads 102. The pressure bars are shown at 103 and the spreader is shown at 105. The lower end portion of the extension 100 is provided with a transverse slot 104 which can receive the heads 103a of the pressure bars 103. Thus, when the pressure bars 103 are inserted into a drill hole and the spreader 105 is driven between the pressure bars, the extension 100 can be readily detached by moving it transversely of the pressure bars 103 so that the cylinder block 101 and its piston rod can be utilized to drive a second spreader between a second pair of pressure bars 103 which are inserted into another drill hole. The upper end of the spreader 105 need not be positively connected with the piston rod which latter is reciprocable in the cylinder block 101.

Figure 39:
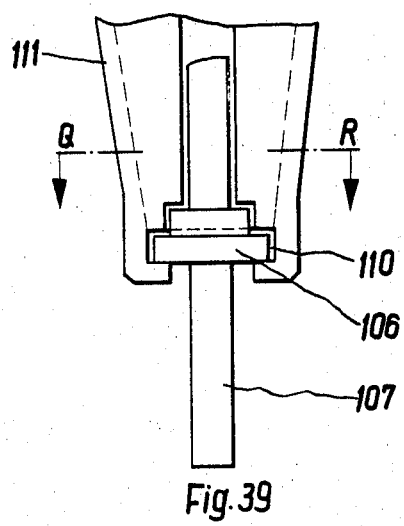
FIG. 39 is a fragmentary side elevational view of a pressure breaker which constitutes a modification of the tool shown in FIGS. 36–38.
Figure 40:
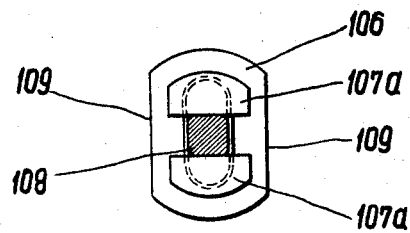
FIG. 40 is a top plan view of the expander in the pressure breaker of FIG. 39.
Figure 41:
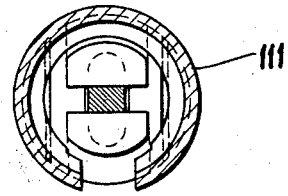
FIG. 41 is a transverse sectional view as seen in the direction of arrows from the line Q–R of FIG. 39.

FIGS. 39 to 41 illustrate one mode of insuring that the pressure bars will remain coupled to each other even if they are separated from the extension of the connecting device which secures them to the cylinder block. These illustrations show a ring 106 which is suspended in the extension 111. The ring 106 has a central slot (see FIG. 40) which receives the heads 107a of pressure bars 107 in such a way that the heads 107a overlie the top face of the ring 106. The wedge-like spreader 108 is received between the pressure bars 107. The ring 106 is provided with two facets 109 which are located diametrically opposite each other so that this ring can be nonrotatably inserted into a transversely extending groove 110 of the extension 111. The cylinder block which is coupled with the extension 111 is not shown in FIGS. 39 to 41.

Referring again to FIG. 36, the numeral 112 denotes wear-resistant layers or coats provided on the internal surfaces of the pressure bars 103. Such layers are applied in the reinforced lower end portion 103b of the expander which includes the pressure bars 103. The layers 112 prevent excessive wear on the reinforced end portion 103b in response to reciprocation of the spreader 105.

FIG. 36 further shows that the upper end portion of the spreader 105 is provided with relatively shallow cutouts 113. This enhances the elasticity of the spreader in the region which is most likely to break.

Figure 42:
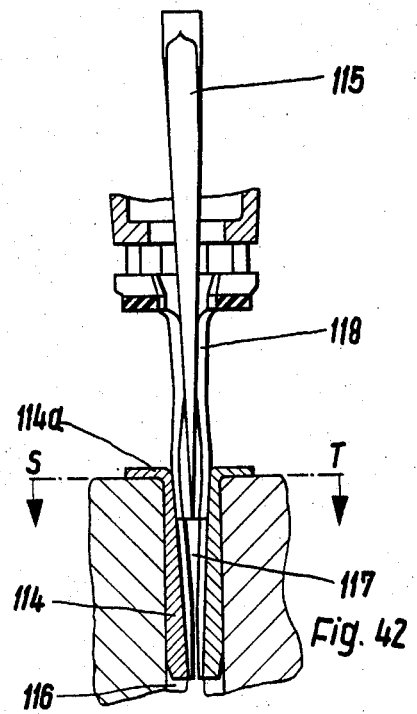
FIG. 42 is a fragmentary sectional view through a rocky formation wherein a drill hole receives specially configurated inserts which permit cracking of the formation by means of a conventional pressure breaker.
Figure 43:
FIG. 43 is a transverse sectional view as seen in the direction of arrows from the line S–T of FIG. 42.
Figure 44:
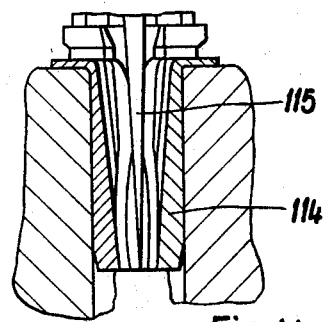
FIG. 44 is a view similar to that of FIG. 42 but showing the pressure bars in fully inserted positions.

Referring finally to FIGS. 42 to 44, there is shown a further embodiment of my invention. The numerals 114 denote tapering inserts which can be introduced into a drill hole 116 and have outwardly extending projections or lugs 114a which overlie the surface at the outer end of the drill hole 116. The inserts 114 will be utilized in connection with existing pressure breakers. In such existing or conventional breakers, the length of the spreader 115 cannot be increased and, in order to achieve further expansion, the inserts 114 are placed into the hole 116 ahead of the pressure bars 118. When the spreader 115 is thereupon caused to move downwardly, it acts upon the pressure bars 118 which in turn act upon the tapering internal surfaces of the inserts 114 so that the inserts stress the material around the hole 116 and cause the formation of a crack. Each insert 114 is preferably bounded by a substantially semicircular external surface, see FIG. 43. The crack is shown at 119. The numeral 117 denotes in FIG. 42 a space whose cross-sectional area decreases in downward direction and which is defined by the inserts 114 to receive the pressure bars. FIG. 44 illustrates the spreader 115 in its upper end position. When the spreader is thereupon caused to move downwardly, it is normally sufficient to shift it through a relatively short distance in order to insure that the inserts 114 will form a crack 119 of requisite width so that the formation in which the bore hole 116 is formed is split.

The pressure breakers of FIGS. 21 to 44 can be utilized in connection with drill holes of different diameters. For example, and referring again to FIGS. 21–24, the pressure bars 66 can be readily detached from the extension 60 for replacement by differently dimensioned pressure bars which can be fitted with a minimum of clearance into a drill hole of larger or smaller diameter. The same holds true for the one-piece spreader 70 which can be readily separated from the piston rod 68. The axial distance between the extension 60 and the upper end of the cylinder block 63 will be varied in order to utilize only a portion of or the entire working stroke of the piston. Furthermore, the pressure breakers of FIGS. 21–44 can be furnished with several sets of pressure bars and spreaders which are detachable from the operating means. For example, and referring again to FIGS. 21 to 24, the pressure bars 66 can be inserted into a first drill hole prior to movement of the spreader 70 in downward direction, as viewed in FIG. 21, whereby the pressure bars stress the material around the drill hole. If the material fails to crack, the spreader 70 is detached from the piston rod 68 and the extension 60 is detached from the heads 67 of the pressure bars 66 which remain in the drill hole and continue to stress the surrounding formation. The operating means including the parts 63, 64, 68 is then used to drive a second spreader 70 between two pressure bars 66 which are inserted into the next drill hole, and so forth until the formation develops a crack. Axial adjustability of the extension 60 with reference to the adapter 64 insures that the pressure breaker can be assembled in such a way that the spreader 70 will begin to deform the pressure bars 66 as soon as it leaves its starting or retracted position. Once the axial position of the extension 60 is properly selected for use with a certain size of pressure bars and spreaders, the operating means can be detached from and attached to successive pressure bars and spreaders without necessitating further adjustments of the extension.

Composite spreaders of the type shown in FIGS. 25–35 will be utilized if the full working stroke of the piston rod does not suffice to crack a block of stone or the like. As shown, all sections of a composite spreader may but need not resemble wedges. For example, the section or pin 76 of FIG. 25 can resemble a cylinder. The principle underlying the operation of the pressure breaker shown in FIG. 33 is different from that of pressure breakers which are illustrated in FIGS. 25 and 28. Thus, the parts 94, 95 are not caused to bear against the outer end of the first section 93 but are driven between this section 93 and the pressure bars in order to insure that the tip of the section 93 need not be advanced beyond the position in which the head 93c engages with the bottom wall of the extension 92. The function of inserts 114 in FIGS. 42–44 is analogous to that of the parts 94, 95, i.e., these inserts are not placed end-to-end with the spreader 115 but surround a portion of the spreader. However, instead of being introduced into the space between the spreader 115 and the pressure bars 118, the inserts 114 are placed between the pressure bars and the surface surrounding the drill hole 116. The pressure bars 118 are preferably provided with external surfaces of semicircular outline which can be fitted into the space 117 between the inserts 114 with a minimum of clearance (see FIG. 43).

In order to further prevent breakage, the lower end portion of each spreader can be made of a material which is harder than the material in the remainder of the spreader. For example, the harder portion can extend along substantially one-fourth of the spreader. Thus, that part of each spreader which is connected with the operating means can be more elastic than the free end portion of the spreader.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. A pressure breaker, particularly for cracking of rocky or like formations which are provided with drill holes, comprising an elongated expander insertable into a drill hole and including a plurality of pressure bars having first and second groups of internal surfaces respectively converging from the one toward the other end and from the other toward the one end of said expander; a pair of spreaders each received between one group of said internal surfaces; a fluid-operated cylinder connected with one of said spreaders; and a piston reciprocable in said cylinder and connected with the other spreader, said piston and said cylinder being movable relative to said expander to displace said spreaders along the respective groups of internal surfaces and to thereby move portions of said bars apart to exert pressure against the material around the drill hole.

2. A pressure breaker as defined in claim 1, including insert means insertable into the drill hole outwardly of at least one of said pressure bars to transmit pressure to the material around the drill hole in response to movement of the spreader relative to said pressure bars.

3. A pressure breaker as defined in claim 2, wherein said insert means comprises a pair of substantially concavo-convex inserts defining between themselves a space which tapers away from the open end of the drill hole.

4. A pressure breaker as defined in claim 3, wherein said inserts comprise projections overlying the surface at the open end of the drill hole.

5. A pressure breaker as defined in claim 1, wherein said cylinder is a double-acting hydraulic cylinder and wherein each of said spreaders is constituted by a wedge, and further comprising elongated motion transmitting members connecting said cylinder with said one spreader.

6. A pressure breaker as defined in claim 2, wherein said expander further comprises a connecting member secured to that end of each pressure bar which is nearer to said cylinder, said connecting member slidably surrounding said motion transmitting members and said other spreader.

7. A pressure breaker as defined in claim 5, wherein said expander comprises two pressure bars and wherein said bars alternate with said motion transmitting members.

8. A pressure breaker as defined in claim 5, wherein said pressure bars comprise end portions remote from said cylinder and said expander further comprises resilient connecting means for said end portions.

9. A pressure breaker as defined in claim 5, wherein said motion transmitting members and said pressure bars together form a substantially rod-shaped body in undeformed condition of said expander.

10. A pressure breaker as defined in claim 5, wherein said one spreader tapers in a direction toward said cylinder and said other spreader tapers in a direction away from said cylinder, said other spreader being disposed between said piston and said one spreader and said spreaders being substantially mirror symmetrical with reference to each other.

11. A pressure breaker as defined in claim 5, wherein said motion transmitting members have end portions remote from said cylinder and further comprising fastener means separably securing the end portions of said motion transmitting members to each other.

12. A pressure breaker as defined in claim 11, wherein the end portions of said motion transmitting members together define a socket for a plug provided on said one spreader.

13. A pressure breaker as defined in claim 5, wherein said motion transmitting members form integral portions of a cylindrical rod having a transverse slot accommodating portions of said pressure bars.

14. A pressure breaker as defined in claim 13, wherein said rod has an end portion remote from said cylinder and provided with a socket for a plug of said one spreader.

15. A pressure breaker as defined in claim 5, wherein said cylinder comprises a first cylindrical portion which receives said piston and a second cylindrical portion connected with said first cylindrical portion and with said motion transmitting members.

16. A pressure breaker as defined in claim 15, wherein said motion transmitting members are provided with heads removably received in sockets provided therefor in said second cylindrical portion.

17. A pressure breaker as defined in claim 5, wherein said expander further comprises a connecting member secured to that end of each pressure bar which is nearer to said cylinder, said connecting member slidably surrounding said motion transmitting members and said other spreader and said ends of said pressure bars having heads removably received in sockets provided therefor in said connecting member.

18. A pressure breaker as defined in claim 17, further comprising resilient retaining means for holding said heads in the respective sockets.

19. A pressure breaker as defined in claim 2, wherein at least a portion of each of said internal surfaces is coated with a layer of wear-resistant material.

20. A pressure breaker as defined in claim 19, wherein said pressure bars comprise reinforced portions in the region of said internal surfaces.

21. A pressure breaker as defined in claim 5, further comprising coupling means for detachably connecting said expander with one of said spreaders.

22. A pressure breaker as defined in claim 21, wherein said coupling is arranged to establish a separable connection between said expander and said other spreader.

23. A pressure breaker as defined in claim 22, wherein said other spreader and said expander are respectively provided with registering first and second cutouts and said coupling means comprises at least one post insertable into a pair of registering cutouts to thereby fix said other spreader to said bars.

24. A pressure breaker as defined in claim 23, wherein said cutouts extend transversely of said expander and wherein said expander further comprises an annular connecting member affixed to that end of each pressure bar which is nearer to said cylinder, said second cutouts being provided in said connecting member.

25. A pressure breaker as defined in claim 24, wherein said coupling means comprises two interconnected posts.

References Cited

UNITED STATES PATENTS

| | | | |
|---|---|---|---|
| 557,143 | 3/1896 | McKinlay | 299—22 |
| 997,889 | 7/1911 | Williams | 299—23 |
| 2,261,017 | 10/1941 | Chandler | 299—23 |
| 2,691,512 | 10/1954 | Arizio | 299—23 |

ERNEST R. PURSER, *Primary Examiner.*

U.S. Cl. X.R.

299—23